United States Patent [19]

Blasbalg

[11] Patent Number: 5,044,319
[45] Date of Patent: Sep. 3, 1991

[54] BIRD FEEDER

[76] Inventor: Morton L. Blasbalg, 22 River Road, East Greenwich, R.I. 02818

[21] Appl. No.: 572,424

[22] Filed: Aug. 27, 1990

[51] Int. Cl.$^5$ .............................................. A01K 39/01
[52] U.S. Cl. ................................................. 119/57.9
[58] Field of Search .................... 119/52.2, 52.3, 57.8, 119/57.9, 54, 70, 51.11; 222/427, 248

[56] References Cited

U.S. PATENT DOCUMENTS

| | | | |
|---|---|---|---|
| 1,181,489 | 5/1916 | Snedaker | 119/70 |
| 2,773,474 | 12/1956 | Dodds | 119/54 |
| 2,944,517 | 7/1960 | Siggins | 119/70 |
| 3,083,687 | 9/1961 | Slaven | 119/57.8 X |
| 3,211,334 | 10/1965 | McShea | 222/427 X |
| 3,372,676 | 3/1968 | Williams | 119/52.3 |
| 4,188,913 | 2/1980 | Earl et al. | 119/52.3 |
| 4,201,155 | 5/1980 | Hyde, Jr. | 119/52.2 |
| 4,318,364 | 3/1982 | Bescherer | 119/52.2 |
| 4,327,669 | 5/1982 | Blasbalg | 119/52.3 |
| 4,570,575 | 2/1986 | Hinz | 119/52.2 |
| 4,632,061 | 12/1986 | Tucker et al. | 119/57.8 |
| 4,690,101 | 9/1987 | Kilham | 119/52.2 |
| 4,896,628 | 1/1990 | Kadunce | 119/52.2 |

FOREIGN PATENT DOCUMENTS 0054436 9/1911 Switzerland ........................ 119/52.2

Primary Examiner—Robert P. Swiatek
Assistant Examiner—Todd E. Manahan
Attorney, Agent, or Firm—Salter & Michaelson

[57] ABSTRACT

A bird feeder includes a vertically disposed tubular upper housing section, a vertically disposed tubular lower housing section on the lower end of the upper housing section and a valve assembly for selectively controlling the flow of birdseed from the upper housing section into the lower housing section. Each of the upper and lower housing sections has a plurality of side feeding apertures therein adjacent the respective lower end thereof and each preferably includes a skirt portion extending outwardly above the side feeding apertures therein for sheltering birds feeding from the feeding apertures and for preventing water from entering the bird feeder.

9 Claims, 3 Drawing Sheets

BIRD FEEDER

BACKGROUND AND SUMMARY OF THE INVENTION

The instant invention relates to bird feeders, and more particularly to a bird feeder which includes vertically spaced, independent upper and lower feeding station areas.

It has generally been found that bird feeders of elongated tubular configuration which are adapted to be either pole mounted or suspended from various wires or other hangers in substantially vertical dispositions can be effectively utilized for feeding various types of birds. Bird feeders of this type generally comprise elongated tubular cylindrical housing portions having side feeding apertures therein, perches beneath the side feeding apertures in the housing portions thereof, and means for restricting the flow of birdseed outwardly through the feeding apertures thereof. Feeders of this type are generally adapted to be utilized by filling the tubular housing portions thereof with birdseed so that feed is accessible to birds located on the feeding perches thereof through the adjacent feeding apertures. However, it has been found that when bird feeders of this type include perches which are positioned at vertically spaced locations the uppermost perches thereof quickly become unusable as the birdseed in the housing portions thereof becomes depleted. Accordingly, it has been found that in most cases only the lowermost perches of feeders of this type can be utilized until substantially all of the feed contained in the housing portions thereof has been consumed. In addition, it has been found that since feeders of this type generally only have single inner storage areas for storing birdseed it is generally not possible to segregate different types of feed with feeders of this type. Still further, it has been found that in many cases it is possible for rain water to pass inwardly through the feeding apertures and/or through seams in the housing portion of feeders of this type causing birdseed in the lower housing portions thereof to become and remain wet.

The instant invention provides a bird feeder of the general type comprising a tubular housing section having a plurality of side feeding apertures therein which effectively overcomes the above disadvantages of the heretofore available bird feeders. Specifically, the feeder of the instant invention includes vertically disposed tubular upper and lower housing sections for receiving birdseed therein and valve means for selectively controlling the flow of birdseed from the upper housing section into the lower housing section. The upper and lower housing sections each have upper and lower ends and each includes a side wall having at least one side feeding aperture therein. The upper housing section is received on the lower housing section so that the valve means is positioned adjacent the lower end of the upper housing section for controlling the flow of birdseed from the upper housing section into the lower housing section, and the lower housing section includes a bottom wall for preventing birdseed from flowing outwardly from the lower housing section. The valve means preferably extends across the lower end of the upper housing section and it preferably includes first and second plates which are rotatable relative to each other for movement between a first position wherein the first and second plates substantially obstruct the lower end of the upper housing section and a second position wherein the lower end of the upper housing section is at most only partially obstructed so that birdseed can flow freely downwardly from the upper housing section into the lower housing section. The valve means preferably further includes a rod which is attached to the first plate of the valve means and extends to the exterior of the upper housing section so that the rod is manipulatable for moving the valve means between the first and second positions thereof. Each of the upper and lower housing sections preferably comprises a tubular main portion and a tubular aperture portion on the lower end of the main portion thereof. Each of the aperture portions preferably has a plurality of side feeding apertures therein and each preferably further comprises a plurality of perches, one perch being positioned adjacent each of the feeding apertures. Still further, each of the main portions of the upper and lower housing sections preferably includes a skirt portion which extends outwardly and downwardly above the apertures in the adjacent aperture portion for preventing rain water from entering the feeder through the apertures in the aperture portions, and also for preventing rain water from entering the feeder through the seams between the main and aperture portions of the upper and lower housing sections.

It has been found that the bird feeder of the instant invention can be effectively utilized for feeding birds and that it effectively eliminates the above described disadvantages of the heretofore available feeders. Specifically, because the feeder of the subject invention includes valve means between the upper and lower housing sections thereof, the upper and lower housing sections can be segregated from one another so that feed from the upper housing section does not flow into the lower housing section as feed is consumed from the feeding apertures in the lower housing section. As a result, both the feeding apertures in the upper housing section and the feeding apertures in the lower housing section can be utilized until substantially all of the feed has been depleted from the feeder. Further, because the feeder includes valve means between the upper and the lower housing sections it is possible to fill the lower housing section with one type of birdseed and to thereafter fill the upper housing section with a different type of birdseed so that numerous different species of birds can be attracted to the feeder. Still further, because the feeder includes skirt portions which extend downwardly and outwardly from the lower ends of the main portions of the upper and lower housing sections, rain water is normally prevented from entering the feeder through the seams between the main portions and the aperture portions, or through the apertures in the aperture portions.

Accordingly, it is a primary object of the instant invention to provide an improved bird feeder comprising upper and lower housing sections which are independently operative for dispensing birdseed.

Another object of the instant invention is to provide a bird feeder comprising upper and lower housing sections and valve means between the upper and lower housing sections for selectively controlling the flow of birdseed from the upper housing section into the lower housing section.

An even still further object of the instant invention is to provide a bird feeder which is operative for segregating two different types of birdseed so that the feeder can be utilized for attracting numerous different types of birds.

An even still further object of the instant invention is to provide a bird feeder comprising tubular upper and lower housing sections having skirt portions which are operative for minimizing rain water penetration into the feeder.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
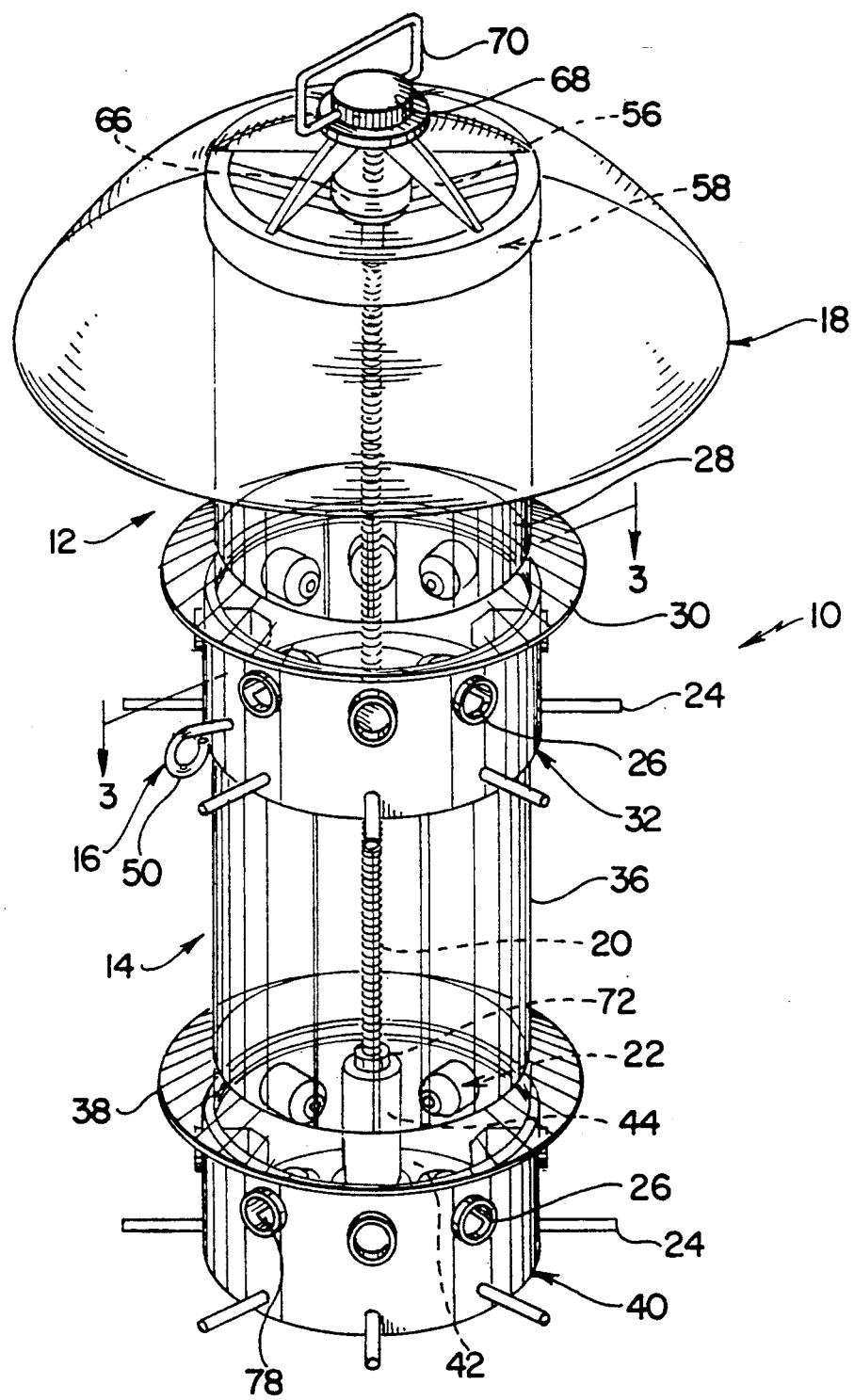
FIG. 1 is a perspective view of the feeder of the instant invention.

Referring now to the drawings, the bird feeder of the instant invention is illustrated and generally indicated at 10 in FIGS. 1 through 4. The bird feeder 10 comprises an upper housing section generally indicated at 12, a lower housing section generally indicated at 14, a valve assembly generally indicated at 16, an upper hood assembly generally indicated at 18, an inner retaining rod 20, a plurality of seed-restricting members 22, and a plurality of perches 24. The bird feeder 10 is assembled so that the upper housing section 12 is received and retained on the upper end of the lower housing section 14 by means of the inner retaining rod 20, and the upper hood assembly 18 extends outwardly from the upper end of upper housing section 12 for shielding the upper and lower housing sections 12 and 14, respectively, as well as any birds on the perches 24 from rain or snow. The valve assembly 16 is assembled on the lower end portion of the upper housing section 12, and it is operative for selectively controlling the flow of birdseed downwardly from the upper housing section 12 into the lower housing section 14. Each of the upper and lower housing sections 12 and 14 has a plurality of side feeding apertures 26 therein, and the flow restricters 22 are operative for restricting the passage of birdseed outwardly through the apertures 26. The perches 24 are assembled on the upper and lower housing sections 12 and 14, respectively, adjacent the apertures 26 for supporting birds while they are feeding from the feeder 10.

The upper housing section 12 comprises a tubular cylindrical main portion 28, a skirt portion 30 which extends downwardly and outwardly adjacent the lower end of the main portion 28 and an aperture portion generally indicated at 32. The main portion 28 and the skirt portion 30 are preferably integrally molded from a suitable transparent plastic material and the aperture portion 32 is preferably cast from a suitable metal, such as aluminum. The aperture portion 32 is also of tubular cylindrical configuration and it has eight circumferentially spaced apertures 26 formed therein. The aperture portion 32 has an inner ridge 34 formed therein for receiving the lower end of the main portion 28, and the skirt portion 30 is positioned so that it extends outwardly from the main portion 28 adjacent the lower end thereof so that it is operative for protecting the seam or joint between the main portion 28 and the aperture portion 32 against moisture penetration.

The lower housing section 14 comprises a main portion 36 and a lower skirt portion 38 which are preferably identical to the main portion 28 and the skirt portion 30, respectively, and an aperture portion generally indicated at 40. The aperture portion 40 is generally similar to the aperture portion 32, although it includes a bottom wall 42 having a centrally disposed upstanding tubular post 44 thereon which is internally threaded for receiving the rod 20 in threaded engagement.

Figure 3:
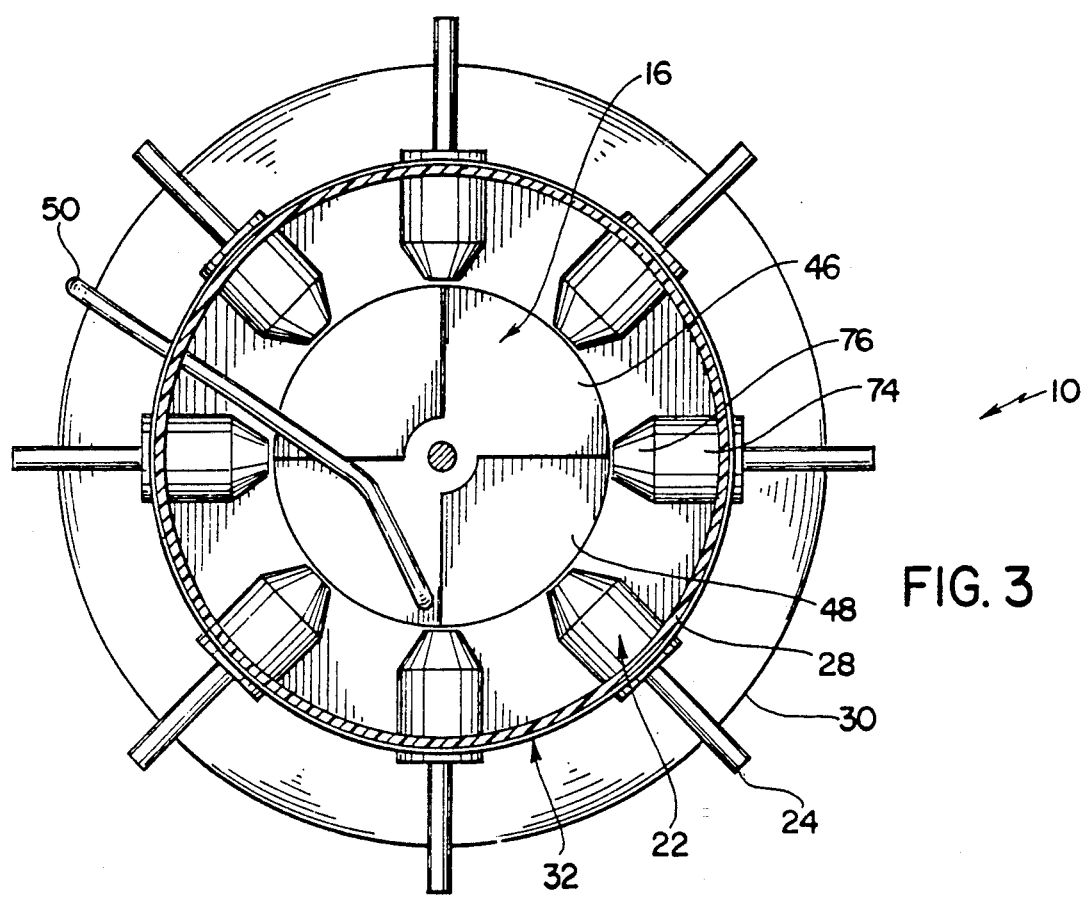
FIG. 3 is a sectional view taken along line 3—3 in FIG. 1 with the valve means in a closed position.
Figure 4:
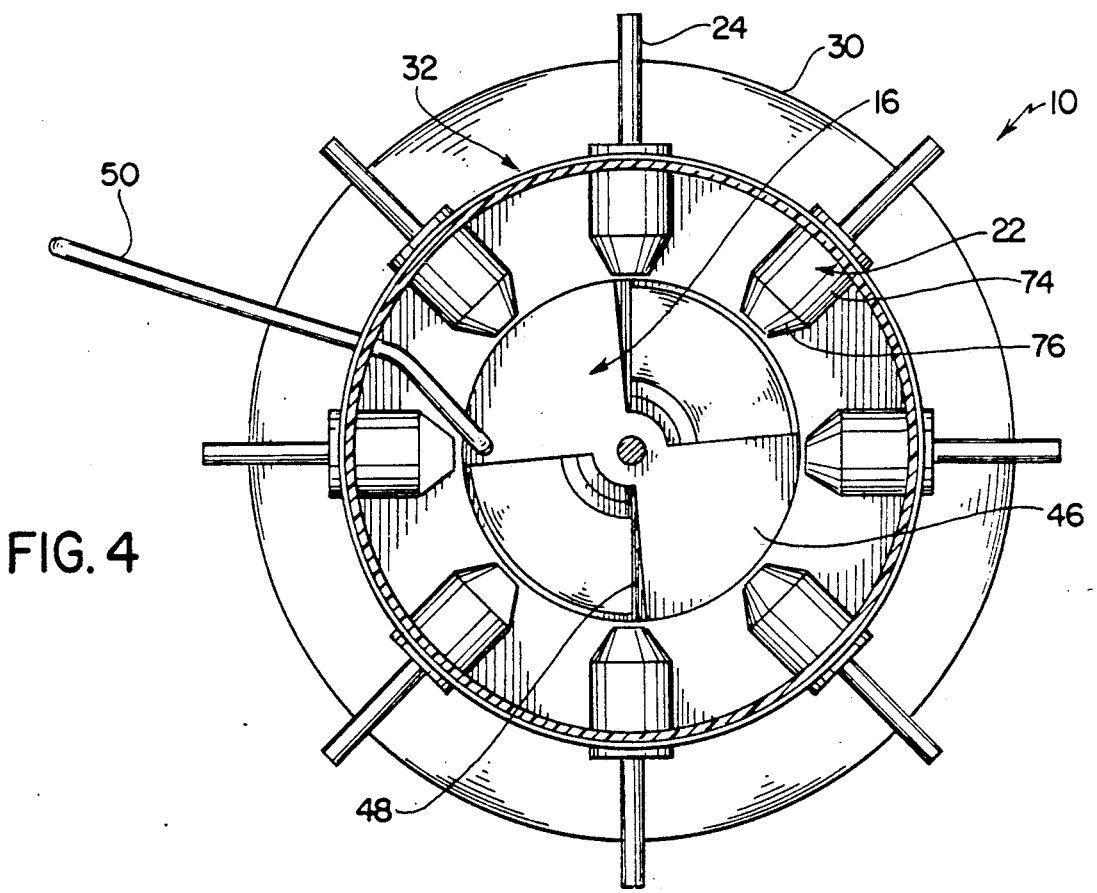
FIG. 4 is a similar view with the valve means in an open position.

The valve assembly 16 is received and secured in the interior of the aperture portion 32 of the upper housing section 12. As illustrated in FIGS. 3 and 4, the valve assembly 16 comprises a rotatable first plate 46, a stationary second plate 48 and an operating rod 50. The first and second plates 46 and 48 each define two opposite quadrants of a circular area which has a diameter equal to that of the interior of the aperture portion 32. The second plate 48 is preferably integrally formed with the aperture portion 32, and the first plate 46 is preferably assembled with the second plate 48 so that it is rotatable relative to the second plate 48 about the central axis of the aperture portion 32. The rod 50 is pivotally attached to the first plate 46 and it extends through a hole in the side wall of the aperture portion 32. Further, the rod 50 is formed in a configuration which enables it to be pulled outwardly from the position illustrated in FIG. 3 to the position illustrated in FIG. 4 for rotating the first plate 46 relative to the second plate 48 in order to move the first plate 46 between aligned and non-aligned positions relative to the second plate 48. As illustrated in FIG. 4, when the first plate 46 is in the open position thereof so that it is aligned with the second plate 48, approximately 50% of the interior cross-sectional area of the aperture portion 32 is unobstructed so that birdseed can flow freely downwardly from the upper housing section 12 into the lower housing section 14. However, when the rod 50 is advanced inwardly so that the first plate 46 is returned to the closed position illustrated in FIG. 3, substantially the entire interior cross sectional area of the aperture portion 32 is obstructed by the first and second plates 46 and 48, respectively.

Figure 2:
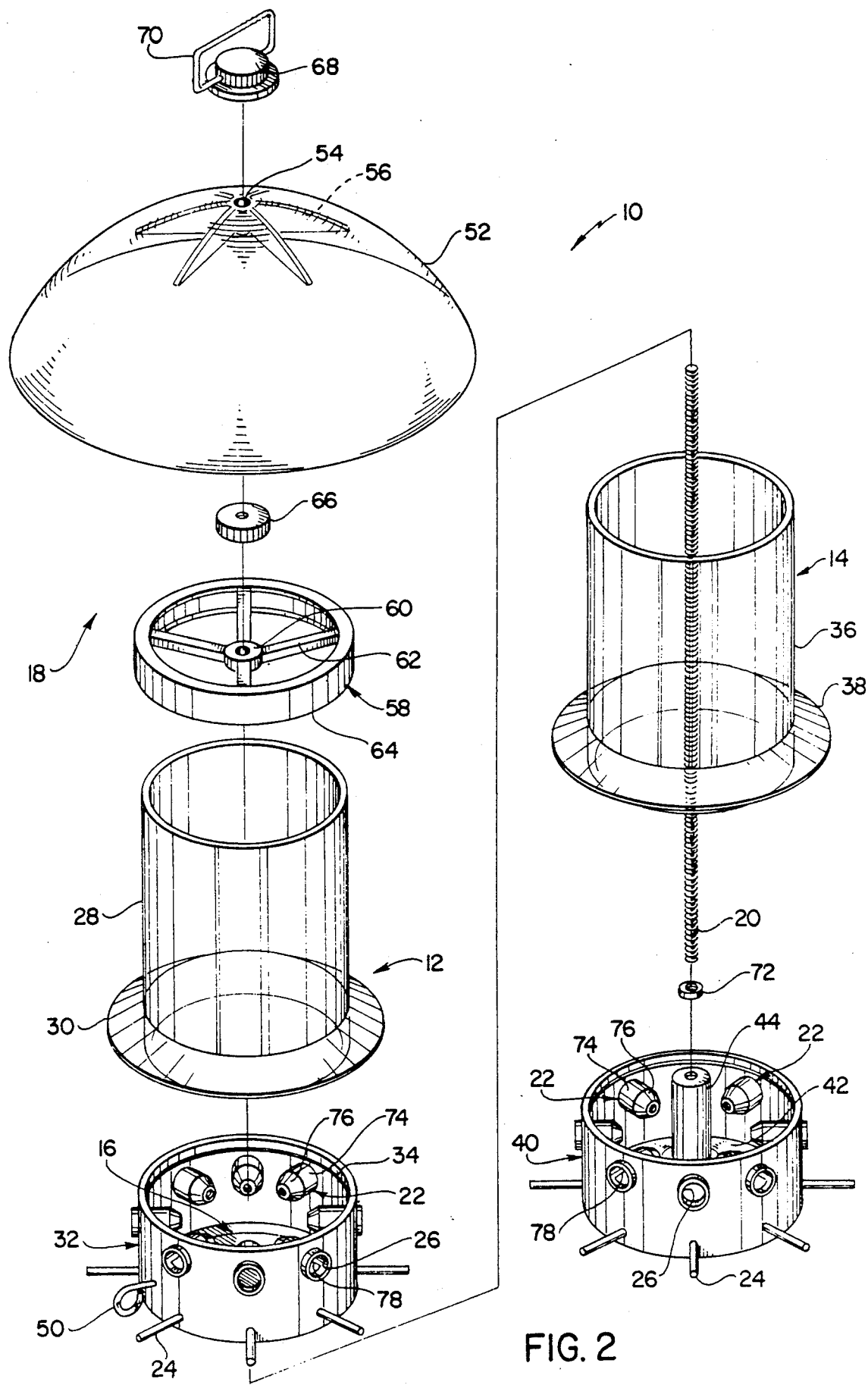
FIG. 2 is an exploded perspective view thereof.

The dome assembly 18 is illustrated most clearly in FIGS. 1 and 2, and it comprises a rounded dome element 52 having a central aperture 54 therein and a plurality of gussets 56 which are disposed around the aperture 54. The dome assembly 18 further comprises an inner ring-shaped support member 58 having a central hub 60, a plurality of spokes 62, and an outer rim 64. The support member 58 is dimensioned to be received on the upper end of the main portion 28 for supporting the dome element 52 thereon. The dome assembly 18 further comprises a knurled nut 66 which is receivable on the threaded rod 20 so that it is positioned above the hub 60 and a threaded upper cap 68 which is receivable on the upper end of the rod 20 so that it is positioned in engagement with the gussets 56 above the dome element 52. The cap 68 includes a hanger member 70 which is adapted for supporting the feeder 10 from a wire or hanger.

The threaded rod 20 comprises a conventional elongated threaded rod and it is received in threaded engagement in the post 44 in the aperture portion 40 of the lower housing section 12, and a locknut 72 is received on the rod 20 for securing the position of the rod 20 relative to the post 44. The rod 20 extends through a central aperture in the valve assembly 16 and through the hub 60 so that the rod 20 is axially positioned with respect to the upper and lower housing sections 12 and 14, respectively. The nut 66 is received on the rod 20 for securing the support ring 58 and the upper and lower housing sections 12 and 14, respectively, in assembled relation, and the dome element 52 is received on the rod 20 so that the rod 20 extends through the bore 54 therein. The threaded cap 68 is received on the upper end of the rod 20 for retaining the dome assembly 18 in assembled relation with the upper and lower housing sections 12 and 14, respectively.

The flow restricters 22 are of conventional construction and each includes a generally cylindrical inner housing 74 having a frusto-conical end portion 76 and a downwardly facing aperture or opening 78. The flow restricters 22 are operative for preventing birdseed from flowing directly outwardly through the apertures 26 in a manner which nevertheless permits birds to retrieve birdseed through the apertures 26 when they are stationed on the perches 24.

The perches 24 are also of conventional construction and they are positioned beneath the apertures 26 as illustrated.

For use and operation of the bird feeder 10 the cap 68 and the dome element 52 are disassembled from the threaded rod 20. The feeder 10 can then be filled by pouring birdseed into the upper housing section 12 through the upper support ring 58. In this connection, when filling the feeder 10 the valve assembly 16 is generally first moved to an open position by pulling the rod 50 outwardly to rotate the first plate 46 to the open position relative to the second plate 48. Accordingly, as feed is passed into the upper housing section 12 it gravitates downwardly through the valve assembly 16 into the lower housing section 14. Once the lower housing section 14 has been filled, the valve assembly 16 is moved to a closed position by advancing the rod 50 inwardly into the aperture portion 32 so that the first plate 46 is positioned in the closed position illustrated in FIG. 3. Thereafter, the upper housing section 12 can be filled with the same or a different type of birdseed by pouring the birdseed through the support ring 58. Once both the upper and lower housing sections 12 and 14, respectively, have been filled with birdseed in this manner the dome element 52 and the cap 68 can again be assembled on the rod 20.

Once the feeder 10 has been filled with birdseed it can either be supported on a post or suspended from a hanger element. Various different birds can then feed from the feeder 10 through the apertures 26 and since the aperture portions 32 and 40 are positioned adjacent the lower ends of the upper and lower housing sections 12 and 14 respectively, birds can continue to feed from the upper and lower housing sections 12 and 14, respectively, until substantially all of the feed in the feeder 10 has been consumed. Further, when the upper and lower housing sections 12 and 14 are filled with different types of birdseed, numerous different types of birds can be attracted to the feeder 10. Further, when the feeder 10 is exposed to rain or snow, the rain or snow is effectively prevented from entering into the feeder 10 through the joints between the main portions 28 and 36, and their respective aperture portions 32 and 40 by the skirt portions 30 and 38, respectively. The skirt portions 38 and 40 also prevent rain from entering the feeder 10 through the feeding apertures 26 so that feed in the upper and lower housing sections 12 and 14 is normally maintained in an essentially dry condition.

It is seen therefore that the instant invention provides an effective bird feeder which has several advantages over the heretofore available feeders. The feeder 10 comprises upper and lower housing sections which are separated by a valve assembly so that birds can feed from both of the upper and lower housing sections until substantially all of the feed from the bird feeder 10 has been consumed. The feeder 10 is also adapted for dispensing different types of bird feed from the upper and lower housing sections 12 and 14, respectively, and it is adapted to prevent moisture from contacting feed contained therein. Accordingly, it is seen that the bird feeder of the instant invention represents a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A bird feeder comprising vertically disposed tubular upper and lower housing means sections for receiving and storing birdseed therein, each of said upper and lower housing means sections having upper and lower ends and each including a side wall having at least one side feeding aperture therein, said lower housing means section including bottom wall means on the lower end thereof, the lower end of said upper housing means section being received on the upper end of said lower housing means section, valve means for selectively controlling the downward flow of birdseed from said upper housing means section into said lower housing means section and means for restricting the flow of bird seed outwardly through said side feeding apertures.

2. In the bird feeder of claim 1, said valve means extending across the lower end of said upper housing means section and being operable from the exterior of said upper housing means section.

3. In the bird feeder of claim 1, each of said upper and lower housing means sections comprising a tubular main portion having a lower end and a tubular aperture portion on the lower end of the main portion, each of said aperture portions having at least one side feeding aperture therein.

4. The bird feeder of claim 3, further comprising perch means adjacent each of said side feeding apertures.

5. The bird feeder of claim 3, further comprising an outwardly extending skirt portion adjacent the lower end of each of the main portions thereof, each of said skirt portions extending outwardly and downwardly above the at least one aperture in the respective adjacent aperture portion thereof.

6. A bird feeder comprising vertically disposed tubular upper and lower housing sections for receiving birdseed therein, each of said upper and lower housing sections having upper and lower ends and each including a side wall having at least one side feeding aperture therein, said lower housing section including bottom wall means on the lower end thereof, the lower end of said upper housing section being received on the upper end of said lower housing section, and valve means for selectively controlling the downward flow of birdseed from said upper housing section into said lower housing section, said valve means including first and second plates in said upper housing section, said first plate being repositionable relative to said second plate for movement between a first position wherein said first and second plates obstruct the lower end of said upper housing section and a second position wherein the lower end of said upper housing section is at most only partially obstructed so that birdseed can flow freely downwardly from said upper housing section into said lower housing section.

7. In the bird feeder of claim 6, said first plate being rotatable relative to said second plate.

8. In the bird feeder of claim 6, said upper housing being of tubular cylindrical configuration, said first plate being rotatable relative to said second plate.

9. In the bird feeder of claim 6, said valve means further comprising a rod attached to said first plate and extending to the exterior of said upper housing section, said rod being manipulatable from the exterior of said upper housing section for repositioning said first plate relative to said second plate.

* * * * *